(12) United States Patent  
White

(10) Patent No.: US 6,400,779 B1  
(45) Date of Patent: Jun. 4, 2002

(54) ESTIMATING CIR USING CORRELATION WITH LINE REMOVAL

(75) Inventor: Peter J. White, Figtree (AU)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/393,262

(22) Filed: Sep. 10, 1999

Related U.S. Application Data

(63) Continuation of application No. PCT/FI98/00213, filed on Mar. 11, 1998.

(30) Foreign Application Priority Data

Mar. 12, 1997 (AU) .............................................. 16241/97

(51) Int. Cl.[7] .................................................. H04L 27/06
(52) U.S. Cl. ....................... 375/343; 375/224; 375/229; 375/258; 375/348; 455/65
(58) Field of Search ................................. 375/343, 224, 375/229, 349, 348, 285; 455/65

(56) References Cited

U.S. PATENT DOCUMENTS 5,127,051 A * 6/1992 Chan et al. .................. 375/348
5,715,279 A * 2/1998 Laakso et al. ............... 375/224
5,822,368 A * 10/1998 Wang .......................... 375/229
5,918,161 A * 6/1999 Kumar et al. .................. 455/65

FOREIGN PATENT DOCUMENTS

| GB | 2 286 509 | 8/1995 |
| WO | 94/18752 | 8/1994 |
| WO | 96/13910 | 5/1996 |

* cited by examiner

Primary Examiner—Stephen Chin  
Assistant Examiner—Shuwang Liu  
(74) Attorney, Agent, or Firm—Pillsbury Winthrop LLP

(57) ABSTRACT

A method of estimating the channel impulse response (CIR) of a communication system is disclosed. The method comprises providing a first estimation of the CIR by an impulse response calculation, using correlation of signals to determine tap weights for the calculation, thereby providing a set of amplitude values within equally time spaced bins. The true path delay of a radio channel represented by the significant peaks in the first estimation is determined, by reference to amplitude values of those of the bins which surround the bin having the greatest amplitude. A refined estimation of the CIR is calculated using the significant peaks, such that these peaks represent substantially all the energy represented by the first estimation of CIR.

5 Claims, 4 Drawing Sheets

ESTIMATING CIR USING CORRELATION WITH LINE REMOVAL

This application is a continuation of application PCT/FI98/00213 filed on Mar. 11, 1998.

FIELD OF THE INVENTION

The present invention is directed to a method of determining the channel impulse response (CIR) of a communication system, such as the CIR of radio channels of a digital mobile radio network (GSM network). In particular, the present invention relates to determining the CIR based on the reception of a known training sequence.

BACKGROUND

In order to determine CIR, a portion of the transmit signal must be known. For a GSM network, Synchronisation bursts (SB) are a useful portion of the signal. The SB are transmitted on at least one channel from every base station, and they are transmitted in a regular pattern. Decoding of the GSM protocols is not necessary. Both the data in the SB and the pattern with which they occur is fixed and substantially identical for all base stations.

The advantage of using SB for determining the CIR is that they represent a relatively long, noise-like predetermined transmitted signal. Typically, 64 bits are transmitted over a period of 237 μsec. The determination of the CIR thus requires sufficient synchronisation to the bursts in the received signal to enable the extraction of the SB which is then processed to determine the CIR.

The CIR is determined by using estimation techniques. In order to estimate the CIR, a known training sequence is transmitted $S_{tx}(t)$, and this is corrupted by a communications channel producing the received signal $S_{rx}(t)$. The problem in estimating the CIR is to determine tap-weights $\{\alpha\}$ of a FIR filter (which is used to approximate the CIR), so that the known $S_{tx}(t)$ after passing through the filter is as close as possible to the received signal $S_{rx}(t)$.

Given the that the transmitted Signal $S_{tx}(t)$ and the received signal $S_{rx}(t)$ is known, the CIR can be estimated from:

1. known samples of the transmitted signal $T_k=S_{tx}(t_0+k\tau)$, $-N_c \leq k < N$ (note that $N+N_c$ samples represent the whole training sequence, the numbering has been arranged to start from the known clean samples of the received signal which occur $N_c$ samples after the start of the training sequence.), and
2. measured samples of the received signal $R_k=S_{rx}(t_0+k\tau)$, $0 \leq k > N$ (the first $N_c$ samples of the training sequence are assumed corrupted and are ignored).

The tap weights $\{\alpha_k\}$ are determined by simple correlation as $$\alpha_k = \sum_{j=0}^{N-1} T_{j-k} R_j \quad 0 \leq k \leq N_c \qquad (2.1)$$

This algorithm relies on the noise-like properties of the transmitted signal whereby its autocorrection function should have low time sidelobes. The sidelobe performance of this algorithm, however, has been found to be limited due to the correlation properties of the "clean" part of the training sequence and the fact that only partial correlations are performed for later weights.

The results of using the algorithm to determine the CIR of a simple channel is shown in FIG. 1. The results indicate a dynamic range of approximately 17 dB and a main lobe width of about 9 μsec at the −10 dB point.

It has been found that the correlation technique is extremely robust in noise, however as can be seen from the illustration of FIG. 1, the resolution is poor (wide main beam) and the dynamic range is limited due to relatively high side lobes.

SUMMARY OF THE INVENTION

The present invention seeks to alleviate the problems experienced in determining CIR with prior art techniques.

Therefore, the invention discloses a method of estimating the channel impulse response (CIR) of a communication system, the method including the steps of:
 (a) providing a first estimation of the CIR by an impulse response calculation using correlation of signals to determine tap weights for said calculation,
 (b) determining the true path delay of a radio channel represented by the significant peaks in said first estimation, and
 (c) calculating a refined estimation of the CIR using said significant peaks, such that said peaks represent substantially all the energy represented by said first estimation of CIR.

According to another aspect the present invention provides a method of estimating CIR, the method including the steps of
 (a) providing a first estimation of the CIR by calculation using correlation,
 (b) identifying a first peak having least attenuation in said first estimation,
 (c) determining the true path delay represented by the first peak from said first estimation,
 (d) calculating a refined estimation of the CIR, from an initial zero refined estimation, by providing a first refined peak in the refined estimation having a path delay corresponding to the true path delay represented by the first peak,
 (e) subtracting from the first estimation components corresponding to said first peak;
 (f) repeating steps (b) to (e), adding further peaks to the refined estimation until substantially all the energy in said first estimate has been subtracted.

The invention further discloses a device adapted to estimate the CIR of a digital communication system, the device comprising:
 first estimating means for determining a first CIR estimation, including impulse response filter means and correlation means for calculating tap weights for said filter means, and
 processing means for determining the true path delay represented by the significant peaks in said first estimation, and calculating a refined estimation of the CIR using said significant peaks, such that said peaks represent substantially all the energy represented by said first estimation of CIR.

The present invention also provides a device adapted to estimate the CIR of a digital communication system, the device comprising:
 first estimating means for determining a first CIR estimation based on correlation,
 first memory means for storing said first CIR estimation,
 second memory means for storing a refined estimation of CIR, and processing means for identifying a first peak having least attenuation in said first estimation, determining the true path delay represented by the first peak from said first estimation so as to define a refined peak, subtracting the correlation components associated with said first peak from said first estimation, and adding said refined peak into said second memory means, said processing means being controlled such that successive peaks in said first estimated CIR are identified, so that after successive iterations a refined estimation of CIR is stored in said second memory means.

The device may be implemented in software on a suitable processing device.

The present invention is based on the realization that the resolution and dynamic range of the technique based on simple correlation can be improved by using a newly developed 'line removal' technique. This involves taking the CIR as determined in the simple correlation, and producing a refined CIR in which the refined CIR is determined by locating the true path delay represented by the peaks resultant from the simple correlation.

This allows for the effects of the less noise-like aspects of the known signal for correlation, that is the larger than desired side lobes, to be minimised or removed from the CIR estimate. The most significant features of the initial correlation are progressively removed from the initial correlation by interpolating their true path delay, adding these peaks to a refined estimation, and subtracting the corresponding correlation components from the initial estimation.

BRIEF DESCRIPTION OF DRAWINGS

Preferred embodiments of the present inventions will now be described with reference to the accompanying drawings, in which.

DETAILED DESCRIPTION

The correlation process detailed in the background has the advantage of being extremely reliable in noise, however, the resolution is poor (wide main beam) and the time sidelobes are larger than is desirable, which limits the dynamic range.

In order to increase the dynamic range, a technique which has been termed "line removal" was developed. The CIR is computed using correlation as described in the background art section, then using the present invention, a refined CIR is generated. In one aspect, all terms in the refined CIR are initially set to zero, the true position and amplitude of a first peak of the CIR is found and a peak with this true position and amplitude is added to the refined estimation. The contribution from this peak is subtracted from all CIR bins in the initial estimation. A peak of the remaining CIR is found and the process repeated until most of the energy has been subtracted from the CIR or until the remaining peaks have little or no material effect on the resultant refined CIR. This procedure has been found to provide a CIR with very high resolution.

The true position of the peak is preferably found by analysing the value of the bins near the peak. It will be appreciated that the process of allocating the signal to a set of bins will often create a situation where the true peak does not have the path delay attributed to any given bin, so that the energy is spread in the CIR between two adjacent bins, and hence the largest bin value does not correspond to the path delay of the true peak—the true delay is somewhat to one side or another of the largest bin value. Other suitable ways of locating the peak may be used, such as determining the peaks apex, for example by calculation.

Figure 1:
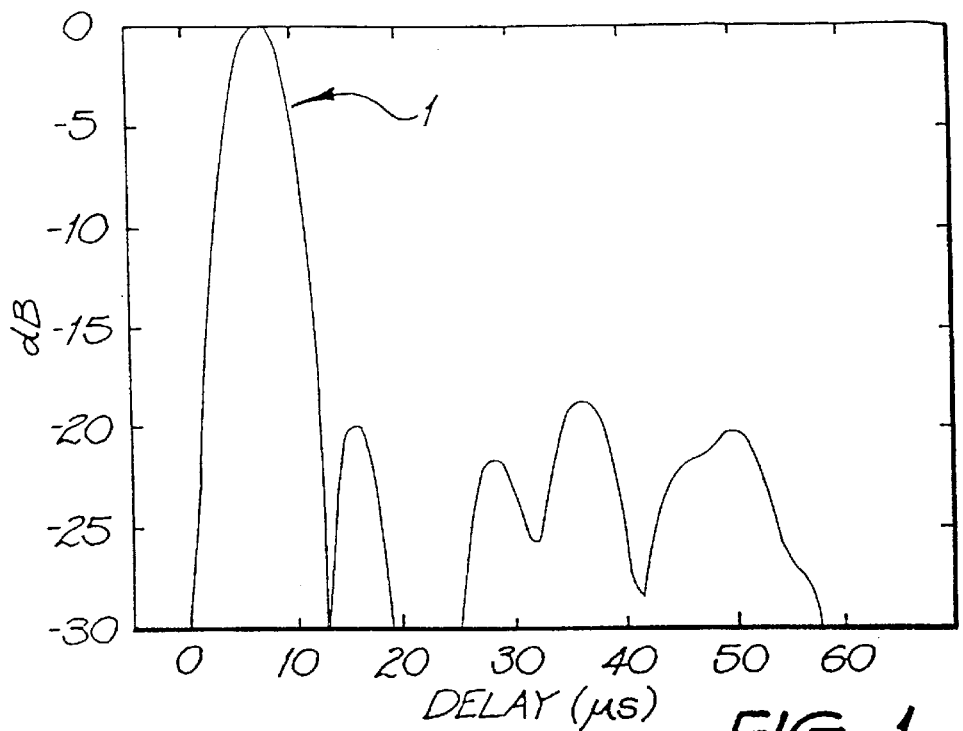
FIG. 1 illustrates the CIR using prior art correlation only.

FIG. 1 shows a CIR obtained by correlation, the channel consists of a single path located at 7 $\mu$s, which coincides with a 'bin' of the computer CIR. In this case, the peak with the highest value (least attenuation or the highest peak) can be determined by analysing the bin values from bin 0 to bin 14 for example as shown in the following Table 1.

TABLE 1

| Bin no:    | 0   | 1   | 2   | 3   | 4   | 5  | 6  | 7 | 8  | 9  |
|------------|-----|-----|-----|-----|-----|----|----|---|----|----|
| Bin Value: | −28 | −25 | −16 | −9  | −5  | −3 | −2 | 0 | −2 | −3 |
| Bin no:    | 10  | 11  | 12  | 13  | 14  |    |    |   |    |    |
| Bin Value: | −5  | −9  | −16 | −25 | −28 |    |    |   |    |    |

It can be seen that the bin with the largest value is bin 7, and that the values in the bins adjacent bin 7 are relatively of equal value on either side of the peak. This can be taken to suggest that the real peak is located at bin 7, and in the example a path delay of 7 $\mu$sec can be taken as the delay attributable to peak 1. A path delay of 7 $\mu$sec equates to a defined bin.

Figure 2:
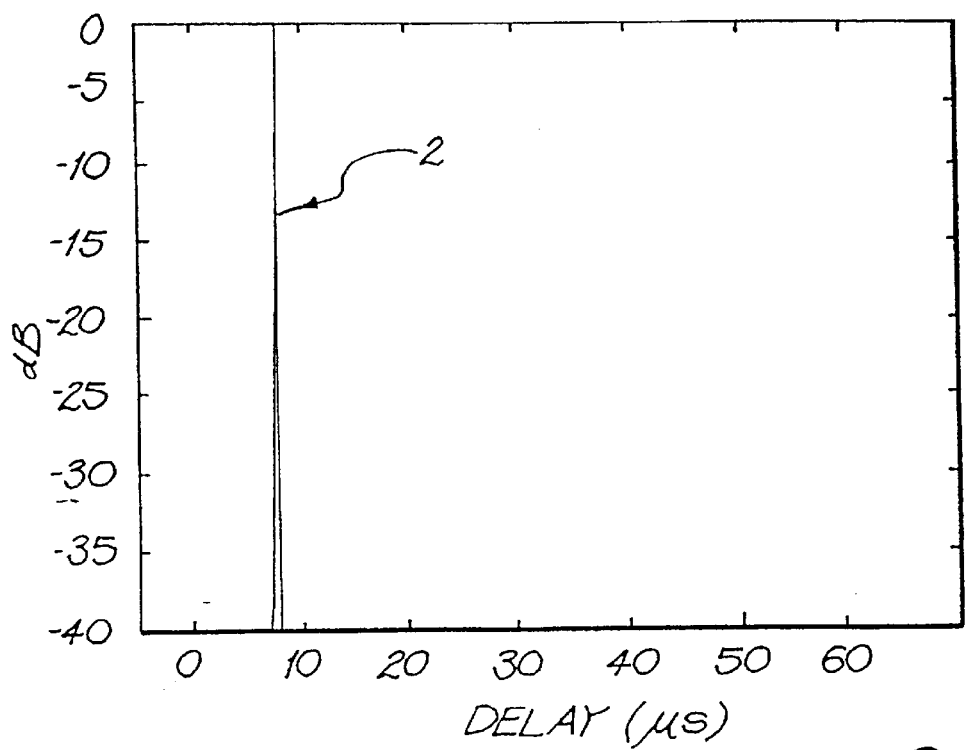
FIG. 2 illustrates a refined CIR using the present invention.

Thus, in the refined CIR as illustrated in FIG. 2, the refined peak 2 has a path delay that corresponds exactly to the 7 $\mu$sec CIR bin. In the case illustrated in FIG. 1, extracting peak 1 from the correlation estimate CIR results in the refined CIR illustrated in FIG. 2, which provides an extremely clean estimate of the channel response.

Figure 3:
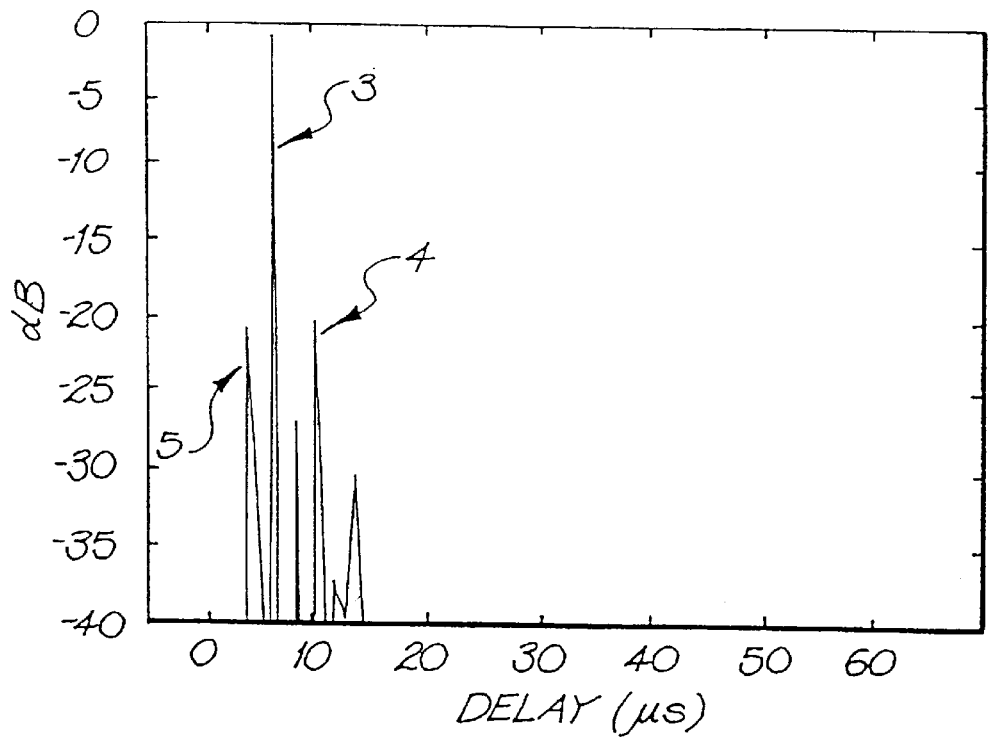
FIG. 3 illustrates a CIR including adjacent peaks.

If, on the other hand, the single path of the channel was found to lie between bins 6 and 7, for example, then the CIR obtained by correlation would look the same as FIG. 1, however shifted slightly to the left (by a fraction of a bin). If the simple line removal algorithm is applied to this then the refined CIR of FIG. 3 results. This shows considerable spurious products due to the fact that no allowance has been made for the path to lie between bins. FIG. 3 is thus what results if our simple algorithm is applied to a situation where the path delay lies between bins.

In FIG. 3 the peak values do not fall cleanly within the bin values–the peak 3 has the highest value from the correlation CIR, but peaks 4 and 5 are of significance either side of or adjacent to peak 3.

The line removal algorithm can be modified to improve performance, this entails allowing for the 'lines' which are removed for the refined CIR to lie in intermediate locations, not just wholly within a bin.

If we knew that the path lay exactly half-way between bins 6 and 7, in the bin arrangement shown in Table 1 then it is possible to refine the CIR by placing half the amplitude in bin 6 of the refined CIR and half in bin 7. If we knew that the path lay at 6.4 then 60% of the amplitude would be placed in bin 6 and 40% in bin 7. In general, if the path lies at 6+x (where x<1), then (1-x) times the amplitude goes into bin 6 and x times the amplitude into bin 7. If this technique is applied where the single path of the channel was found to lie between bins, then the result is FIG. 4, a considerable improvement on FIG. 3. Note that the peak in FIG. 4 extends over 2 bins, contrast to FIG. 2 which falls exactly in one bin.

Now the only problem is to determine the value of x. This is where the quadratic interpolation comes in. Imagine that the bins are not as in Table 1 but are, for example, as follows:

TABLE 2

| Bin No.   | 4    | 5    | 6    | 7 | 8    | 9    |
|-----------|------|------|------|---|------|------|
| Bin Value | −4.5 | −2.5 | −1.5 | 0 | −2.5 | −3.5 |

Note that the peak is in bin 7, however, bins 6 and 8 have unequal values, indicating that the peak actually lies away from bin 7. Quadratic interpolation can be used here to determine the value of x as described.

Figure 6:
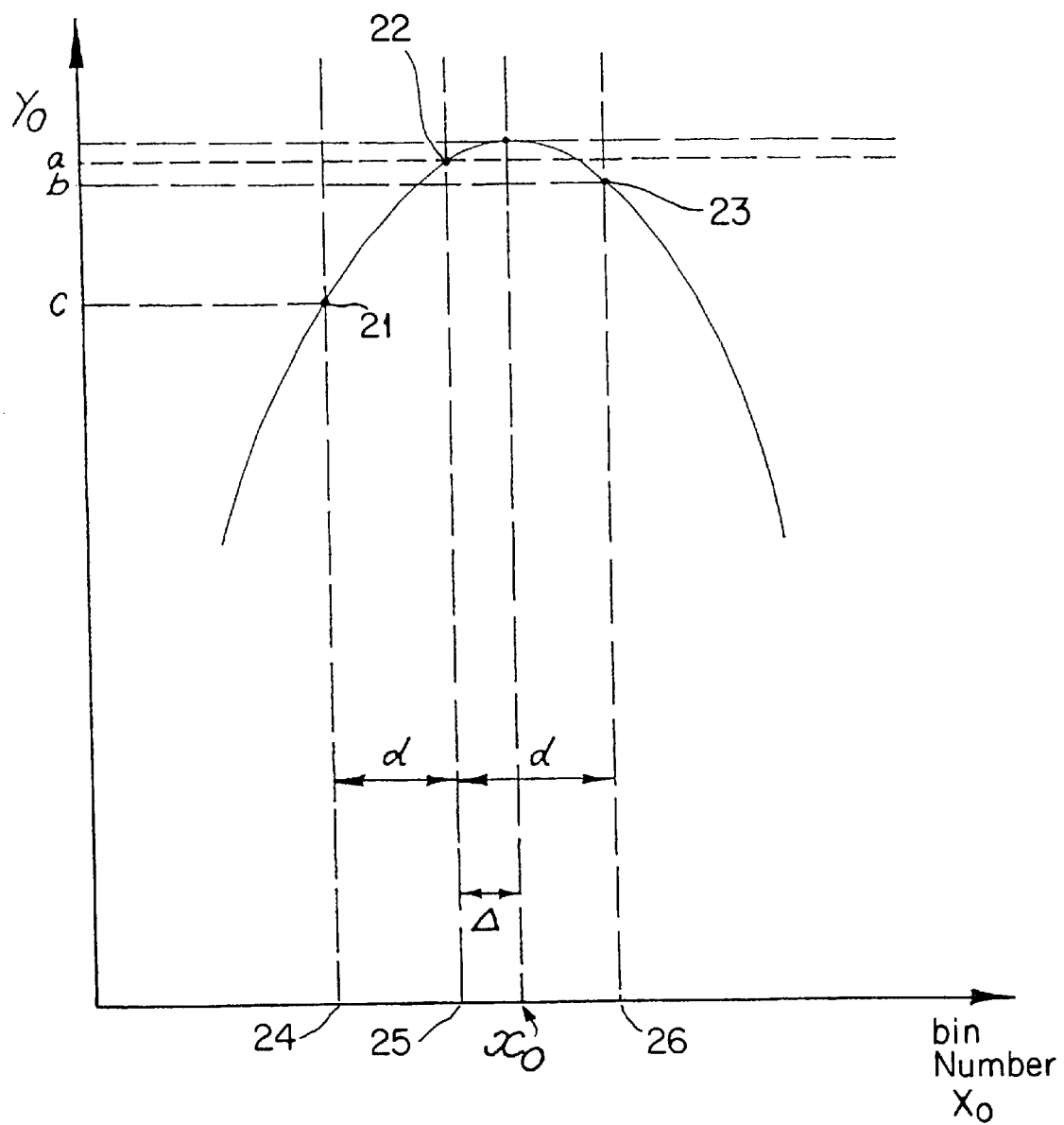
FIG. 6 is a graphical illustration of the quadratic approximation technique.

The assumption is that the data points, or bin values, captured fall on a parabolic curve. The true peak of the curve is at ($x_o$, $y_o$). The curve shown in FIG. 6 is defined by the function $$y = y_o - a(x - x_o)^2$$

Assume that 3 data points 21, 22 and 23, corresponding to respective CIR amplitude values for bin numbers 24, 25 and 26 are available. The time interval between the data points 21 and 22, which is equal to the time interval between the data points 22 and 23, is known, each of these time intervals being equal to "d", as this is the width of each of the bins. The value of a determines the curves shape, and is usually known in this application, or can be determine from the determined value for " a".

The observed peak has values $$y = a \text{ at } x = x_o - \Delta$$

The neighboring bins have values $$y = b \text{ at } x = x_o + d - \Delta$$

$$y = c \text{ at } x = x_o - d - \Delta$$

hence, $$b = y_o - \alpha(d - \Delta)^2$$

$$c = y_o - \alpha(d + \Delta)^2$$

$$\rightarrow b - c = 4\alpha d \Delta$$

$$\Rightarrow \Delta = \frac{b - c}{4\alpha d}$$

The values $x_o$, $y_o$ can therefore be derived. This process can be readily implemented, for example, in hardware or in software.

Interpolation using such an approximation determines that the true location of the center of peak 3 is at approximately 5.04 μsec. The height of the peak is kept as the height of the original peak. The resultant refined CIR peak 6 with spread calculated is illustrated in FIG. 4.

Importantly, the correlation components corresponding to the calculated peak 6 are subtracted from the initial CIR, so as to remove the energy associated with this peak. This process can then be repeated on the residual CIR, which is this case produces a further peak 7 in FIG. 4. This process can be repeated until all significant energy is removed from the residual CIR, producing a refined CIR with much better dynamic range. The termination point of the process can be determined in a variety of ways. One alternative which is reasonably simple to implement is to run the process a predetermined number of times, say 40, which experience suggests in the systems of interest will capture the relevant peaks. An alternative is to specify a maximum amount of energy, for example 1%, which can be left in the initial correlated CIR when the refined peaks are subtracted.

Figure 4:
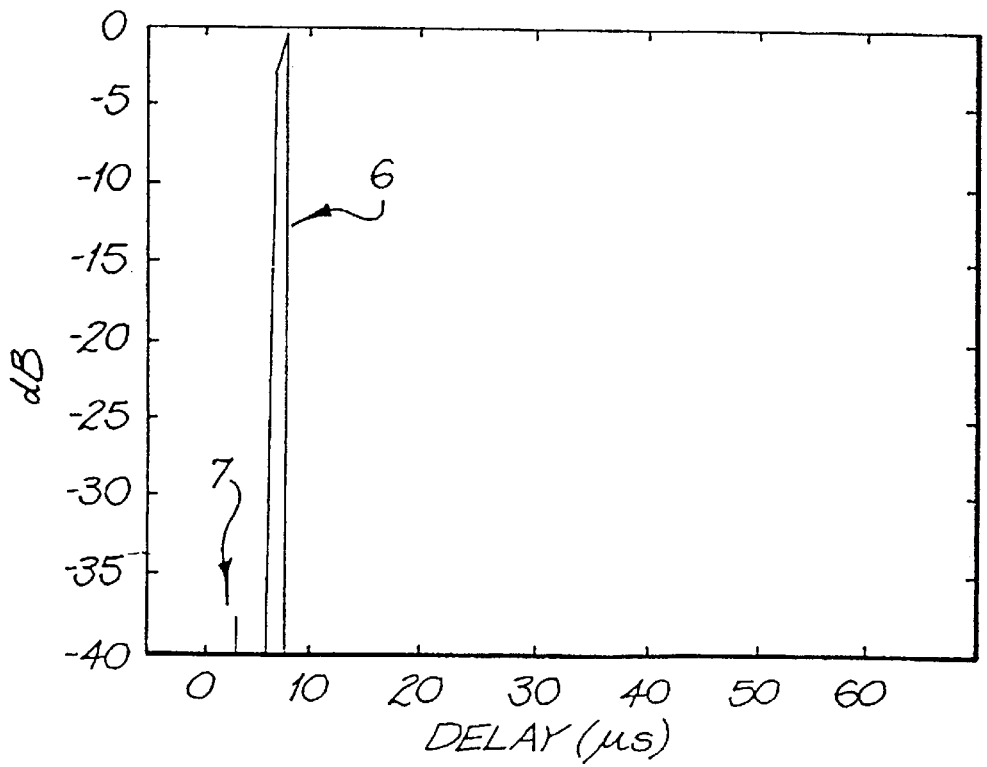
FIG. 4 illustrates the line removal technique result corresponding to FIG. 3.

The resulting residual 7 as illustrated in FIG. 4 is lower indicating that the CIR is a better estimate of the channel response. The line removal algorithm has also been found to perform well in noise.

Figure 5:
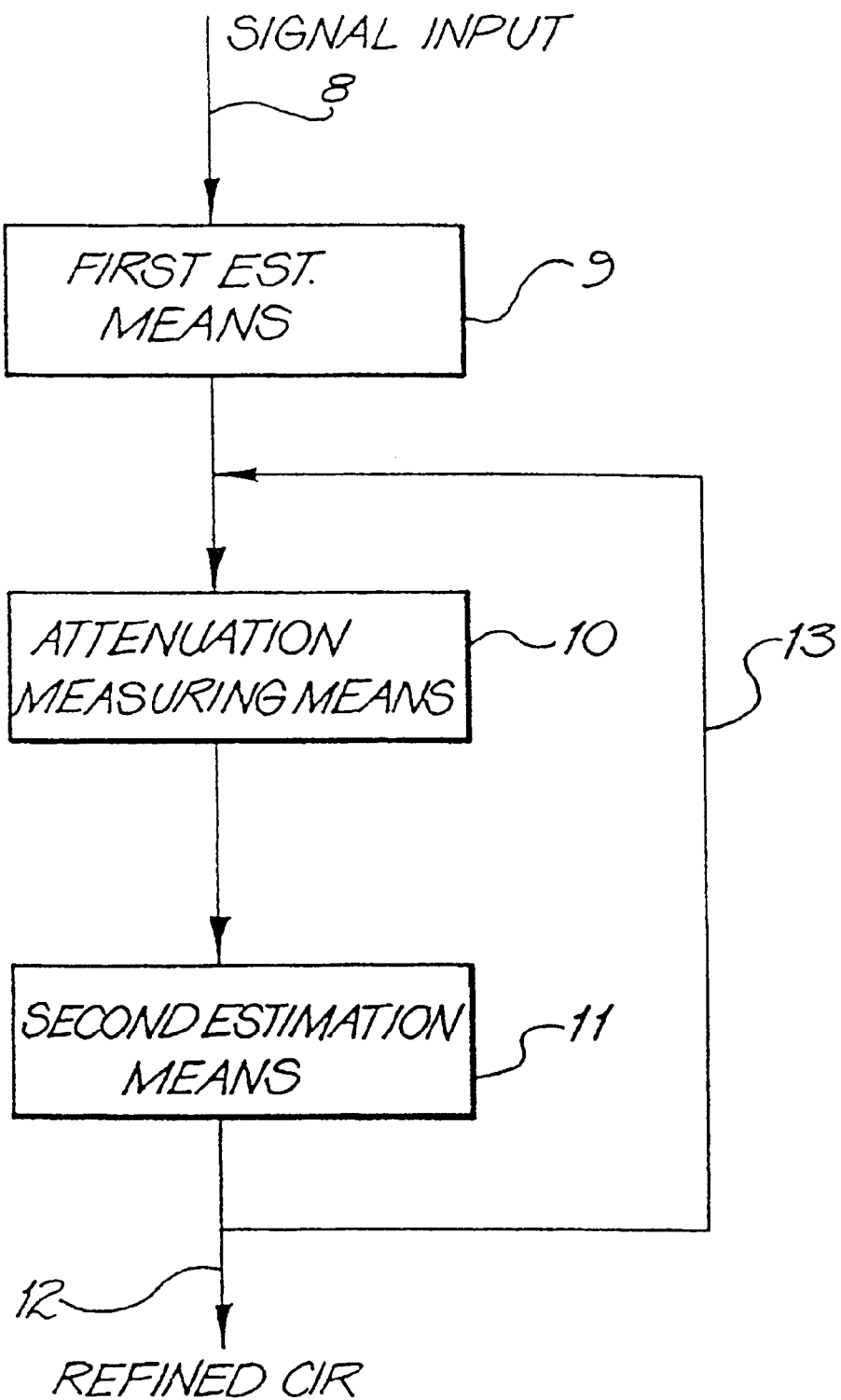
FIG. 5 is a schematic illustration of the refined estimation process.

FIGS. 5–9 illustrate, in a schematic form, an embodiment of a device adapted to implement the present invention. The signal input 8 represents the incoming communication system signal. This signal 8 is feed to a first estimation means 9, the function of which is to calculate the first estimation of the CIR using correlation techniques, but without the aid of the present invention. As shown in FIG. 7, the first estimation means 9 may include an impulse response filter means 15, correlation means 16, and first memory means 17. The output of the first estimation means 9, which is shown in FIGS. 5 and 7–8 as output 14, is provided as input to the attenuation measuring means 10 as shown in FIGS. 5 and 7–8. The attenuation measuring means 10 determines the position of the first peak with regard to the bin values (that is the highest peak(s) illustrated in FIG. 1.). As shown in FIG. 8, the attenuation measuring means may include a highest peak determining means 18 and a path delay determining means 19. As shown in FIGS. 5 and 8–9, the position information determined by the attenuation measuring means 10 is provided to the second estimation means 11 which compriles a refined CIR based on the location of peak positions, and as described by reference to FIG. 1. As shown in FIG. 9, the second estimation means 11 may include a subtracting means for highest peak/path delay 21 and a second memory means 22. Path 13 illustrates the iterative nature of the process as described with reference to FIG. 2. In the situation described with reference to FIG. 4, the attentuation measuring means 10 determines the true path delay of the peak maps a peak spread to the refined CIR 12.

The resulting CIR's generated using line removal have been found to be very sultable for further processing (determining delay dispersion ratio and C/I) as they contain relatively few bins which are non-zero. This speeds these further processing algorithms.

What is claimed is:

1. A method of estimating the channel impulse response (CIR) of a communication system, the method including the steps of:

(a) providing a first estimation of the CIR by an impulse response calculation, using correlation of signals to determine tap weights for said calculation, thereby providing a set of amplitude values within equally time spaced bins, (b) determining the true path delay of a radio channel represented by the significant peaks in said first estimation by reference to amplitude values of those of said bins surrounding the one of said bins having the greatest amplitude, and (c) calculating a refined estimation of the CIR using said significant peaks, such that said peaks represent substantially all the energy represented by said first estimation of CIR.

2. A method of estimating the channel impulse response (CIR) of a communication system, the method including the steps of:

(a) providing a first estimation of the CIR by an impulse response calculation using correlation of signals to determine tap weights for said calculation, thereby providing a set of amplitude values within equally time spaced bins, (b) identifying a first peak having least attenuation in said first estimation, (c) determining the true path delay represented by the first peak from said first estimation by reference to amplitude values of those of said bins surrounding the one of said bins having the greatest amplitude, (d) calculating a refined estimation of the CIR, from an initial zero refined estimation, by providing a first refined peak in the refined estimation having a path delay corresponding to the true path delay and amplitude represented by the first peak, (e) subtracting from the first estimation components corresponding to said first peak; and (f) repeating steps (b) to (e), adding further peaks to the refined estimation until substantially all the energy in said first estimate has been subtracted.

3. A device adapted to estimate the CIR of a digital communication system, the device comprising:

first estimating means for determining a first CIR estimation, including impulse response filter means and correlation means for calculating tap weights for said filter thereby providing a set of amplitude values within equally time spaced bins, and processing means for determining the true path delay represented by the significant peaks in said first estimation by reference to amplitude values of those of said bins surrounding the one of said bins having the greatest amplitude, and calculating a refined estimation of the CIR using said significant peaks, such that said peaks represent substantially all the energy represented by said first estimation of CIR.

4. A device according to claim 3 wherein said device further comprises first memory means for storing the first CIR estimation, and second memory means for storing the refined CIR estimation.

5. A device adapted to estimate the CIR of a digital communication system, the device comprising:

first estimating means for determining a first CIR estimation, including impulse response filter means and correlation means for calculating tap weights for said filter means, thereby providing a set of amplitude values within equally time spaced bins, and processing means for determining the true path delay represented by the significant peaks in said first estimation by reference to amplitude values of those of said bins surrounding the one of said bins having the greatest amplitude and calculating a refined estimation of the CIR using said significant peaks, such that said peaks represent substantially all the energy represented by said first estimation of CIR, wherein said processing means further includes means for identifying a first peak having least attenuation in said first estimation, determining the true path delay represented by the first peak from said first estimation so as to define a refined peak, subtracting the correlation components associated with said first peak from said first estimation, and adding said refined peak into said second memory means, said processing means being controlled such that successive peaks in said first estimated CIR are identified, so that after successive iterations a refined estimation of CIR is stored in said second memory means.

* * * * *